United States Patent [19]

Lavely

[11] Patent Number: 4,622,862
[45] Date of Patent: Nov. 18, 1986

[54] ACTUATOR ROD FOR PUSH-PULL MECHANISMS
[75] Inventor: Daniel Lavely, Mt. Clemens, Mich.
[73] Assignee: Rockwell International Corporation, Pittsburgh, Pa.
[21] Appl. No.: 734,523
[22] Filed: May 16, 1985
[51] Int. Cl.⁴ .............................. G05G 1/02
[52] U.S. Cl. ....................... 74/588; 74/593; 74/579 R
[58] Field of Search ............. 74/579 R, 588, 593
[56] References Cited

U.S. PATENT DOCUMENTS

| | | | |
|---|---|---|---|
| 922,263 | 5/1909 | Cole | 74/588 |
| 2,178,858 | 11/1939 | Hufferd | 74/579 |
| 2,453,079 | 11/1948 | Rossmann | 74/579 |
| 2,470,540 | 5/1949 | Young | 74/579 |
| 2,497,319 | 2/1950 | Mott | 74/593 |
| 2,851,903 | 9/1958 | Norris et al. | 74/579 |
| 3,058,367 | 10/1962 | Hoffmann | 74/593 |
| 3,121,348 | 2/1964 | Reed | 74/588 |

Primary Examiner—Alan Cohan
Assistant Examiner—John A. Rivell

[57] ABSTRACT

An actuator rod for push-pull mechanisms including a slotted cylindrical-shaped jacket member and a flat rod member disposed within the slot of the jacket member for registration therewith.

8 Claims, 8 Drawing Figures

ACTUATOR ROD FOR PUSH-PULL MECHANISMS

BACKGROUND OF THE INVENTION

1. Field of the Invention

The present invention is generally directed to actuator rods used in push-pull mechanisms and, more specifically, to a multi-piece, multi-material actuator rod.

2. Description of the Prior Art

Various types of rod members are used to translate movement of one mechanical part to another associated mechanical part, such as in push-pull mechanisms. Generally, these rod members are of one-piece construction and require special machining of their end sections for connection of the rod members to other devices. Such machining necessitates additional time and fabrication effort, as well as loss of material which results in increased costs. This is of particular disadvantage since substantial heavy materials must be utilized to form the rod members in order that they may withstand imposed stress, strain and torque loading, particularly when utilized in a push-pull function.

SUMMARY OF THE INVENTION

The present invention avoids the shortcomings and disadvantages of known rod members by providing for a two-piece actuator rod, with one piece comprised of a rod member that is preferably made of steel plate having stock thickness and formed by punching, thereby resulting in more economical production of same. The second piece of this actuator rod includes a jacket member which is slid onto the rod member for reinforcing same. The jacket member is made of any rigid material, preferably of plastic and particularly including some type of crystalline thermoplastic polymer. The jacket member may be bonded directly to the rod member. Moreover, it is preferred that the jacket and rod members are mechanically locked together by mounting means which connects both members to an associated device.

An object of the invention is to provide an actuator rod comprising a rod member with a first hole passing therethrough at a first end and a second hole passing therethrough at a second end thereof, and a jacket member having an axially extending slot therethrough for registration therein of the first end of the rod member. The jacket member further includes an opening passing therethrough, with the opening being located in the jacket member such that when the first end of the rod member is registered within the slot, the first hole is aligned with the opening.

In a preferred embodiment, the rod member is in the form of a flat steel bar and the jacket member is formed from a crystalline thermoplastic polymer. Furthermore, the actuator rod includes a stopping means for preventing the rod member from passing completely through the jacket member. This stopping means preferably includes at least one laterally extending ear at the first end of the rod member, the ear including a forward facing shoulder that abuts a complementing rearward facing shoulder on the jacket member. Additionally, the jacket member is preferably cylindrical in configuration with a conically tapered end extending towards the second end of the rod member and a flat opposite end. The jacket member includes a circumferential groove located between its flat and tapered ends.

Other objects and advantages of the invention shall become apparent from the following detailed description thereof when taken in conjunction with the drawings wherein like reference characters refer to corresponding parts in the several views.

DETAILED DESCRIPTION OF THE PREFERRED EMBODIMENT

Figures 1, 2, 3:
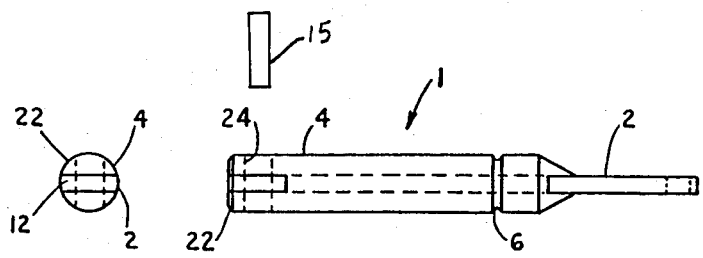
FIG. 1 is a side elevational view of an actuator rod according to a preferred embodiment of the present invention.
FIG. 2 is an end view of the actuator rod of FIG. 1 when viewed from the left side thereof.
FIG. 3 is an end view of the actuator rod of FIG. 1 when viewed from the right side thereof.
Figures 4, 5, 6:
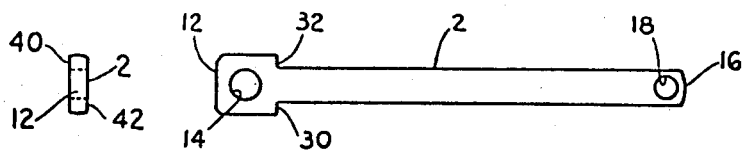
FIG. 4 is a plan view of a rod member forming one piece of the actuator rod of FIG. 1.
FIG. 5 is an end view of the rod member of FIG. 4 when viewed from the left side thereof.
FIG. 6 is an end view of the rod member of FIG. 4 when viewed from the right side thereof.

An actuator rod 1, according to a preferred embodiment of the invention, shall now be described with initial reference to FIGS. 1-3. As shown therein, rod 1 is composed of two component pieces, including a rod member 2 and a jacket member 4. A headed end 12 of rod member 2, as more particularly seen in FIGS. 4-6, is provided with a hole 14 therethrough for inserting a pin 15 or other similar device for connecting actuator rod 1 to a clevis or other associated device. An end 16 of rod member 2 includes a mounting means in the form of a hole 18 which allows for the connection of the other end of actuator rod 2 to another associated device by means of a pin. Rod member 2 is preferably formed by punching a steel plate of stock thickness. Rod member 2 can also be treated to prevent or retard corrosion of its surfaces which may be exposed to high humidity or critical environments.

Figure 7:
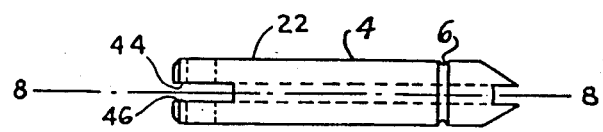
FIG. 7 is a side elevational view of a jacket member forming the other piece of the actuator rod of the invention.
Figure 8:
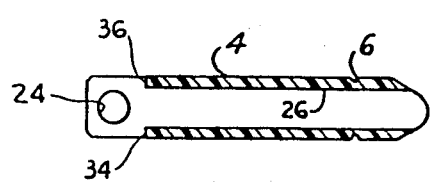
FIG. 8 is a sectional view taken along the line 8—8 of FIG. 7.

As shown in FIGS. 7 and 8, jacket member 4 is generally of a cylindrical configuration. Jacket member 4 can be formed from a variety of materials, preferably plastic material and specifically from those plastics including crystalline thermoplastic polymers offering high mechanical strength, stiffness and toughness. A first end 22 of jacket member 2 includes a hole 24 which, when actuator rod 1 is assembled, is aligned with hole 14 of rod member 2. Jacket member 4 further includes a slot 26 which passes completely through jacket member 4 along its longitudinal axis and disposed perpendicular to the axis of hole 24. The width and thickness of slot 26 is such that rod member 2 may be slid into slot 26.

To prevent rod member 2 from being able to completely pass through jacket member 4 through slot 26, headed end 12 of rod member 2 is provided with a pair of shoulder sections 30 and 32 which engage complementing expanded face sections 34 and 36, respectively, provided within jacket member 4. By virtue of this construction, jacket member 4 thereby prevents rod member 2 from passing completely through jacket member 4.

Jacket member 4 further includes a circumferential groove 6 for receiving a mounting ring or other similar appliance carried by an associated device.

Jacket member 4 provides transverse strength to rod member 2, particularly in the push mode of a push-pull mechanism, or when rod member 2 is subjected to bending or torque stresses.

The foregoing describes an actuator rod according to a preferred embodiment of the invention and may be embodied in other specific forms without departing from the spirit or central characteristics of the disclosed invention. Accordingly, the invention is not to be limited to the specific embodiment illustrated and described herein, and the true scope and spirit of the invention are to be determined by reference to the appended claims.

I claim:

1. An actuator rod for push-pull mechanisms comprising an elongate rod member having a first hole therethrough at a first end thereof and a second hole therethrough at a second end thereof, an elongate jacket member having a longitudinally extending cavity therethrough for receiving the rod member therein and registration of the first end of the rod member, the jacket member including an opening therethrough and positioned such that when the first end of the rod member is registered within the cavity, the first hole is aligned with the opening, said rod member and said jacket member being held together by a pin which also connects the actuator rod to another associated device in said push-pull mechanism.

2. The actuator rod of claim 1 wherein the rod member is in the form of a flat bar and the cavity is in the form of a slot which extends completely through the jacket member.

3. The actuator rod of claim 2 further including a stopping means for preventing the rod member from passing completely through the jacket member.

4. The actuator rod of claim 3 wherein the stopping means includes at least one laterally extending ear section carried by the first end of the rod member and a complementing face formed in the jacket member for engagement by the ear section.

5. The actuator rod of claim 4 wherein the stopping means includes a pair of laterally extending ear sections and a pair of complementing faces.

6. The actuator rod of claim 1 wherein the rod member is formed of steel and the jacket member is formed of a crystalline thermoplastic polymer.

7. The actuator rod of claim 1 wherein the jacket member is cylindrical in configuration and includes a conically tapered first end extending towards the second end of the rod member when the rod member is received within the cavity, and a flat second end for registration with the first end of the rod member.

8. The actuator rod of claim 7 wherein the jacket member includes a circumferential groove disposed between the first and second ends.

* * * * *